F. M. SIMPSON.
NUT LOCK.
APPLICATION FILED AUG. 21, 1913.
1,106,248.
Patented Aug. 4, 1914.
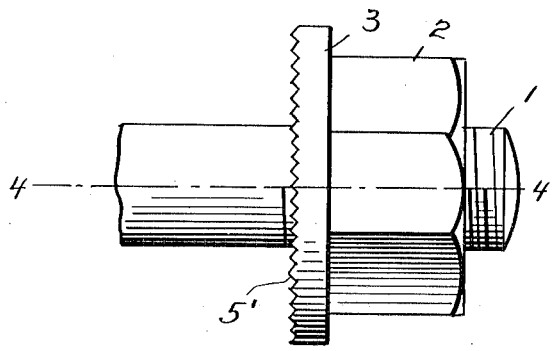
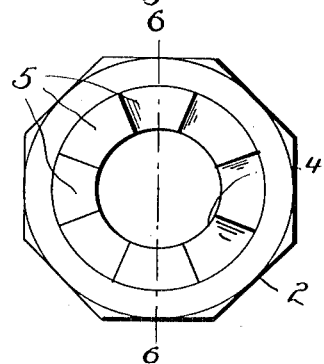
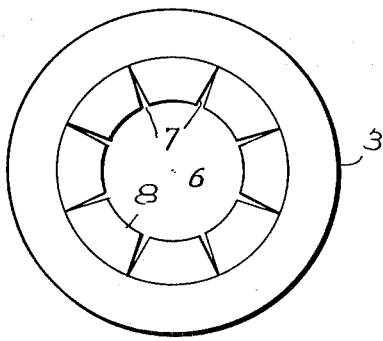
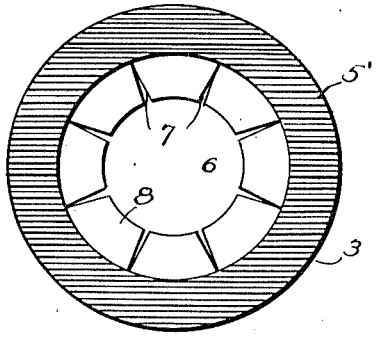
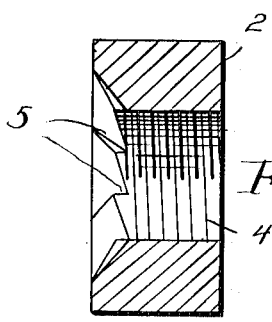
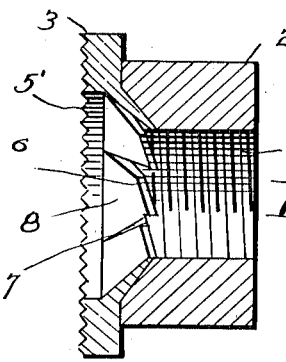
Witnesses
R. N. Jones
C. L. Landow
Inventor
F. M. Simpson.
By
Attorney

UNITED STATES PATENT OFFICE.

FRANK M. SIMPSON, OF ALAMEDA, CALIFORNIA.

NUT-LOCK.

1,106,248.  Specification of Letters Patent.  Patented Aug. 4, 1914.

Application filed August 21, 1913. Serial No. 786,020.

*To all whom it may concern:*

Be it known that I, FRANK M. SIMPSON, a citizen of the United States, residing at Alameda, in the county of Alameda and State of California, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks, and has particular reference to that type of such devices in which a ratchet face nut is arranged for locking engagement with a ratchet washer.

The principal object of this invention is to provide a device of the character set forth which will operate to effectually lock a nut on a bolt against negative rotation.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a side elevation illustrating the nut and washer in locked relation on a bolt shank; Fig. 2 is a front face view of the washer; Fig. 3 is a rear face view of the washer; Fig. 4 is a section on the line 4—4 of Fig. 1; Fig. 5 is a front elevation of the ratchet face of the nut in disassembled relation; Fig. 6 is a section on the line 6—6 of Fig. 5.

Proceeding now to the description of the drawings, the numerals 1, 2 and 3 designate, respectively, as entireties, the bolt shank, nut, and locking washer of this invention. The bolt shank 1 is of the terminally threaded type, forms no part of this invention and need not, therefore, be described in detail. The nut 2 may be of the usual hexagonal or square type and is provided with the customary concentric threaded bore 4, which receives the bolt shank 1. The nut 2 of this invention differs from the ordinary type of nut only in the fact that it is formed on its washer engaging face with a substantially funnel-shaped concavity, the annular wall of which is formed to produce an annular series of ratchet teeth, as at 5.

The washer, designated in Fig. 1 as an entirety by the numeral 3, is formed of a metallic disk and is serrated on its rear face to produce a number of spaced ribs or elongated teeth 5', which extend in parallel spaced relation to each other. The washer is centrally apertured, as at 6, to provide an opening for the reception of the bolt shank. A plurality of radially extending slits 7 are cut in the washer from the edge of the opening 6 and are in length approximately equal to half the distance between the edge of the opening 6 and the outer edge of the member 3. The tongues 8 thus formed are stamped outwardly, as will be observed by reference to Fig. 4, and are slightly twisted to produce a convex ratchet conformation of the outer face of the central portion of the washer. In twisting the members 8, the outer faces of the tongues are disposed to lie in planes approximately parallel to the plane of the faces of the ratchet teeth 5 of the nut.

The actual construction of the various elements of the nut lock of this invention being thus disclosed, it now remains to describe the operation of the various parts when the nut and washer are applied to the bolt and are disposed in locked relation. Briefly, the operation is as follows:—After the bolt has been seated in the structure, the washer is placed on the shank of the bolt with the teeth or ribs 5' in engagement with the adjacent face of the structure to which the bolt is applied. It will be apparent that the teeth 5, by engagement with the adjacent structure, will prevent the rotation of the washer when the nut is threaded on the bolt, and the ratchet teeth 5 are brought into engagement with the tongues 8 of the washer. When the nut has been tightened on the bolt shank to bring the inner face of the nut in severe engagement with the outer face of the washer, it will be apparent that the tongues 8 will be disposed in engagement with the ratchet teeth 5. In this connection it is, of course, apparent that while the tongues 8 and ratchet teeth will operate in no way against the positive rotation of the nut, they will effectually prevent the negative rotation of the nut on the bolt shank.

In reduction to practice, I have found that the form of my invention, illustrated in the accompanying drawings and referred to in the above description, as the preferred embodiment, is the most efficient and practical; yet, realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

What is claimed is:

In a nut lock the combination with a nut having a funnel shaped concavity on its inner face, of a centrally apertured washer plate, ratchet teeth formed on the annular wall of said concavity, a plurality of gripping ribs formed on the rear face of said washer, a plurality of locking tongues formed on the front face of said washer and arranged arcuately around the edge of the aperture therein, said tongues being spaced at their inner ends from the rear edge of the aperture and face of the washer and being twisted to produce a funnel shaped ratchet conformation of their outer faces, and said tongues being adapted to fit within the concavity and engage said ratchet teeth therein to lock the nut when brought into engagement with said washer.

In testimony whereof I affix my signature in presence of two witnesses.

FRANK M. SIMPSON.

Witnesses:
ETHEL JONES,
WM. S. PAYNE.